US007684093B2

(12) United States Patent
Shiokawa et al.

(10) Patent No.: US 7,684,093 B2
(45) Date of Patent: Mar. 23, 2010

(54) IMAGE READING APPARATUS AND COPYING APPARATUS

(75) Inventors: Tsuyoshi Shiokawa, Hachioji (JP); Mitsuru Nagoshi, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 883 days.

(21) Appl. No.: 11/508,384

(22) Filed: Aug. 22, 2006

(65) Prior Publication Data

US 2007/0047026 A1 Mar. 1, 2007

(30) Foreign Application Priority Data

Sep. 1, 2005 (JP) ............................ 2005-253206

(51) Int. Cl.

| | |
|---|---|
| ***H04N 1/04*** | (2006.01) |
| ***H04N 1/32*** | (2006.01) |
| ***B65H 5/22*** | (2006.01) |
| ***B65H 3/44*** | (2006.01) |

(52) U.S. Cl. ...................... 358/474; 358/496; 358/498; 358/468; 271/3.06; 271/9.04

(58) Field of Classification Search ................ 271/3.01, 271/3.06, 3.09, 3.14, 8.1, 186, 9.04; 358/400, 358/404, 474, 505, 498, 496, 1.9; 399/16, 399/136, 361, 363, 367, 368, 369, 383

See application file for complete search history.

(56) References Cited

U.S. PATENT DOCUMENTS

| | | | | |
|---|---|---|---|---|
| 5,298,937 | A | 3/1994 | Telle | |
| 5,915,159 | A | 6/1999 | Okada | |
| 6,101,005 | A * | 8/2000 | Araki et al. | 358/498 |
| 6,333,797 | B1 | 12/2001 | Katsuta et al. | |
| 7,525,692 | B2 * | 4/2009 | Nakaya | 358/461 |
| 7,525,698 | B2 * | 4/2009 | Horaguchi | 358/474 |
| 2002/0036808 | A1 * | 3/2002 | Tohyama et al. | 358/497 |

(Continued)

FOREIGN PATENT DOCUMENTS

| | | |
|---|---|---|
| JP | 2002-354192 | 12/2002 |

(Continued)

OTHER PUBLICATIONS

European search report for 06119365.2-1522, mailed Nov. 22, 2006, 5 pgs.

*Primary Examiner*—Jerome Grant, II

(74) *Attorney, Agent, or Firm*—Squire, Sanders & Dempsey L.L.P.

(57) ABSTRACT

An image reading apparatus for reading images on original documents, including: a first reading section to read the images on the original documents; a second reading section to read the images on the original documents at a position downstream of a reading position of the first reading section, in a transporting direction of the original documents; and a controller; wherein, the controller controls in such a way that: the first reading section and the second reading section alternately read images on multiple original documents sequentially from document to document; and when an original document is transported to the reading position of the second reading section without an image on the original document being read by the first reading section, a transporting speed of the original document is higher than a transporting speed while the image on the original document being read.

13 Claims, 7 Drawing Sheets

A B 1 2 3 4 7 8 5 6 10a 7B 7E S1 10 9 9 9 Pa

SE1 SE2 CR SK1 SK2 M G1 G2

U.S. PATENT DOCUMENTS

2002/0039207 A1* 4/2002 Kanda ........................ 358/498
2002/0044793 A1* 4/2002 Okitsu et al. ................ 399/140
2002/0176115 A1 11/2002 Yamamoto
2005/0157319 A1* 7/2005 Mizuhashi et al. ........... 358/1.9
2005/0162712 A1 7/2005 Shiraishi et al.
2005/0254105 A1 11/2005 Muzzin et al.
2006/0170090 A1* 8/2006 Shinma et al. .............. 257/686
2006/0203308 A1* 9/2006 Shirai et al. ................. 358/498
2006/0291013 A1* 12/2006 Shimizu ..................... 358/498
2007/0069451 A1* 3/2007 Iwago et al. ................ 271/186
2007/0071461 A1* 3/2007 Kitano ........................ 399/16

FOREIGN PATENT DOCUMENTS

JP 02002368960 * 12/2002
JP 2003-125168 4/2003
JP 02005067822 * 3/2005

* cited by examiner

IMAGE READING APPARATUS AND COPYING APPARATUS

CROSS REFERENCE TO RELATED APPLICATION

The present application is based on Japanese Patent Application No. 2005-253206 filed with Japan Patent Office on Sep. 1, 2005, the entire content of which is hereby incorporated by reference.

BACKGROUND OF THE INVENTION

1. Field of the Invention

The present invention relates to an image reading apparatus and a copying apparatus having the image reading apparatus.

2. Description of Related Art

Image reading apparatuses have been widely used for copying apparatuses and facsimile machines, etc. in which one reading section faces a transport path of original document, and conducts sequential reading of multiple original documents by sequentially passing multiple original documents through a reading position.

When reading each single face of the original documents, the sequential reading is conducted by simply transporting each of the multiple original documents sequentially. And when reading double faces of the original documents, a front face and a rear face of the original document are read by passing one original document twice through the reading position with using a switchback section. Further, in the case of double face reading, in order to realign the page order of the original documents after reading, each of the original documents is passed through the switchback section two times. In this way, the image reading apparatus, employing the double face reading function, conducts original documents transportation by twice employing the front/rear reversal operation for double face reading and page order realignment of the original documents.

As a the result, in an image reading apparatus having a double face reading function, the original documents transportation becomes somewhat complicated, the transport path becomes longer and the time required for image reading becomes also longer. Whereby, improving the reading speed becomes difficult.

In order to improve the speed in double face reading, Patent Document 1 and 2 propose image reading apparatuses which provide a reading section for each side of the original document transport path and conduct double face reading by simply transporting the multiple original documents sequentially.

Patent Documents 1 and 2 propose, in the image reading apparatus having two reading sections, to realize additional functions with the two reading sections. Patent Document 1 proposes a recovery function in case of failure in one of the reading sections, wile Patent Document 2 proposes a variety of reading functions.

Patent Document 1: Unexamined Japanese Patent Application Publication No. 2002-354192

Patent Document 2: Unexamined Japanese Patent Application Publication No. 2003-125168

According with improving performance in image forming apparatuses such as electrophotographic image forming apparatuses, demands for high-speed reading are increasing. Namely, not only improving the double face reading speed, as proposed in the Patent Documents 1 and 2, but also improving the single face reading speed is demanded.

It has been assumed that for improving the speed of the single face reading, very little room remains for modification of the original document transport path, contrary to the case of double face reading.

For example, improvement of the reading speed by way of increasing the transportation speed of the original document has limitation due to an inherent decrease of resolving power of the read image.

In apparatuses proposed by Patent Documents 1 and 2, the speed of double face reading is raised, however the speed of single face reading remains unchanged in generally used original reading apparatus described above.

SUMMARY

Structures reflecting the features of the present invention are as follows.

(1) An image reading apparatus for reading images on original documents, including: a first reading section to read the images on the original documents; a second reading section to read the images on the original documents at a position downstream of a reading position of the first reading section, in a transporting direction of the original documents; and a controller; wherein, the controller controls in such a way that the first reading section and the second reading section alternately read images on the sequential multiple original documents; and when the original document is transported to the reading position of the second reading section without having been read by the first reading section, the transporting speed of the original document is higher than the transporting speed while reading the images.

(2) An image reading apparatus for reading images on original documents, including: a first reading section to read the images on the original documents; a second reading section to read the images on the original documents at a position downstream of a reading position of the first reading section, in a transporting direction of the original documents; a first switchback section; a second switchback section; a first gate to switch and transport or not an original document to the first switchback section; a second gate to switch and transport or not the original document to the second switchback section; and a controller;

wherein the controller controls in such a way that in cases where an image on single face of each of multiple original documents is read, the multiple original documents are transported without passing them through the first and the second switchback sections, and the first reading section and the second reading section alternately read images on the sequential multiple original documents; and in cases where images on double faces of multiple original documents are read, the multiple original documents are transported to pass through the first and the second switchback sections, and the first reading section reads the images on a first face of the multiple original documents and the second reading section reads images on a second face of the multiple original documents.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

Embodiments of the present invention will be described below, however, the present invention is not meant to be restricted to these embodiments.

(Copying Apparatus)

Figure 1:
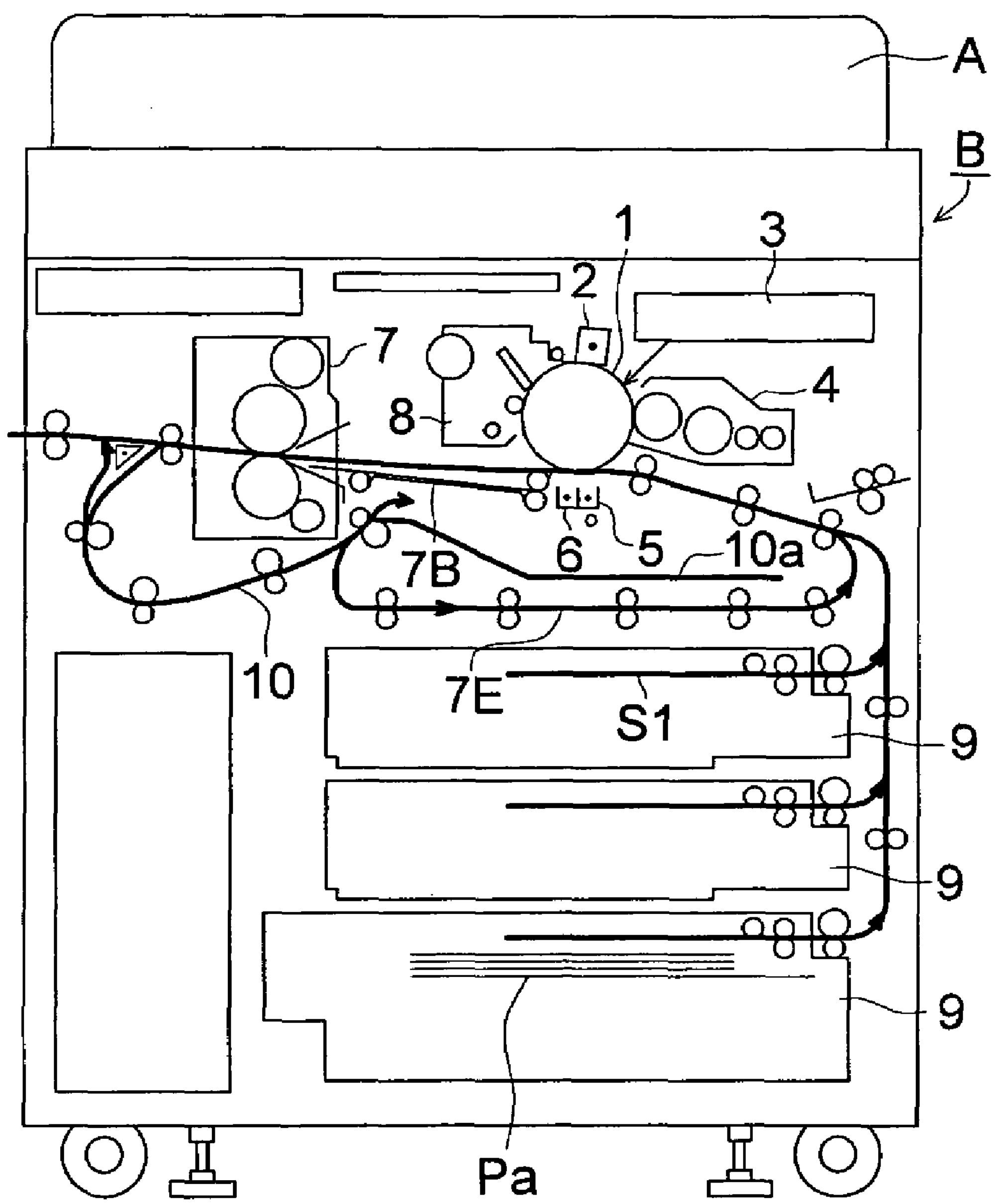
FIG. 1 illustrates an overall diagram of a copying apparatus relating to an embodiment of the present invention.

FIG. 1 shows an overall view of a copying apparatus relating to the embodiment of the present invention.

The copying apparatus is provided with an image reading apparatus A and an image forming apparatus B.

Image reading apparatus A, as described below, transports one by one multiple original documents stacked on a sheet supply section, and performs a single face reading, as well as double face reading if necessary to form image data.

In image forming apparatus B, 1 denotes a photoreceptor, which is preferably an organic photoreceptor comprising a photosensitive layer including an organic photoconductor dispersed in resin. The photoreceptor is not restricted to this type, but any known photoreceptor may be utilized.

Further, photoreceptor 1 is not restricted to a drum type as shown in FIG. 1, but may instead be a belt type photoreceptor. Item 2 indicates a charging device which electrically charges the photoreceptor 1 to form a uniform electric potential on the photoreceptor 1. Charging device 2 is preferably a scorotron charger having a control grid and a charging electrode, or a contact charging type charger using a voltage applying roller.

Item 3 indicates an exposure device to expose image data onto the photoreceptor 1. As exposure device 3, preferable are a scanning exposure device having a scanning optical system comprising a laser diode light source, a polygonal mirror, lens and mirrors; and a scanning optical device comprising a light-emitting diode and an optical fiber image focusing member, however, the exposure device is not meant to be restricted to these types and any known exposure devices may be utilized. Exposure device 3 performs dot exposure on photoreceptor 1 according to image data.

Item 4 indicates a developing device which contains two-component developer or single component developer and develops an electrostatic image on photoreceptor 1 to form a toner image. Item 5 indicates a transfer device including a corona charger. Transfer device 5 charges the recording member Pa at the reverse polarity of the toner polarity to transfer the toner image onto the recording member Pa. Item 6 indicates a separating device comprising a corona charger. Separating device 6 applies alternating-current corona charging onto recording member Pa and neutralizes charges on recording member Pa to easily separate it from photoreceptor 1.

Item 7 indicates a fixing device, item 8 indicates a cleaning device, and item 9 indicates a recording member container structured with a tray or a cassette which can be replenished with recording member Pa by drawing the container out of the image forming apparatus.

By charging, exposing, and developing, a toner image is formed on photoreceptor 1, and by transfer device 5, the toner image is formed on recording member Pa. The toner image is fixed on the recording member by fixing device 7. After transfer, photoreceptor 1 is cleaned by cleaning device 8.

Item 10 indicates a transport path, to form a rear face image, comprising reversal transport path 10*a* to reverse front/rear faces of recording member Pa.

(Structure of Image Reading Apparatus)

Figure 2:
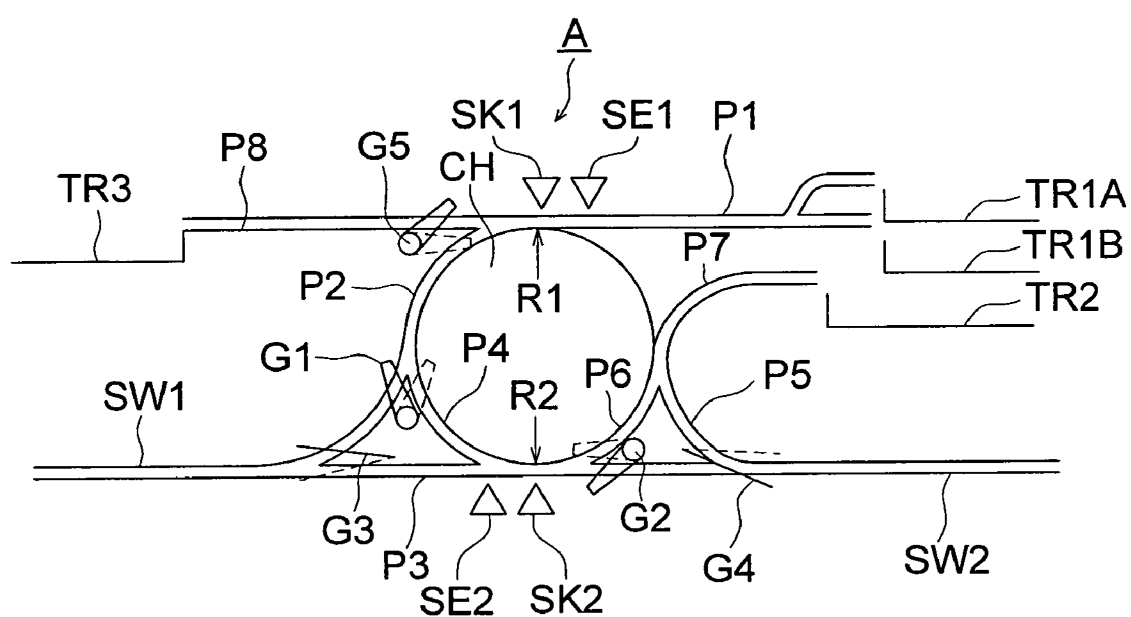
FIG. 2 illustrates a diagram showing a structure of an image reading apparatus relating to an embodiment of the present invention.

FIG. 2 shows a basic structure of the image reading apparatus relating to the embodiment of the present invention.

Image reading apparatus A comprises sheet supply trays TR1A and TR1B as a sheet supplying section; sheet ejecting trays TR2 and TR3 as a sheet ejecting section; reading sensor SK1 as a first reading section; reading sensor SK2 as a second reading section; circular transport path CH which is approximately circular; first switchback section SW1; second switchback section SW2; first gate G1, second gate G2 and third gate G5 for switching the transport path; and guide members G3 and G4.

The original document transport path comprises sheet supply path P1, which extends from sheet supply trays TR1A or TR1B to the reading position of reading sensor SK1; transport path P2, which extends from reading position R1 of first reading sensor SK1 to the entrance of first switchback section SW1; transport path P3, which extends from first switchback section SW1, through the exit of the first switchback section, through second reading position R2 of second reading sensor SK2, to the entrance of second switchback section SW2; transport path P4, which bypasses first switchback section SW1; transport path P5, which extends from the exit of second switchback section SW2 to exit path P7; transport path P6, which bypasses second switchback section SW2; exit path P7, which extends to exit tray TR2; and transport path P8, which extends from first reading position R1 to third exit tray TR3.

SE1 is an document sensor to detect an original document passing through the first reading position R1, and SE2 is an document sensor to detect an original document passing through the second reading position R2.

Regarding reading sensors SK1 and SK2, used can be a reduction imaging optical system, a CCD reading sensor, a contact sensor having a contact type line sensor or the like, which are conventionally known. First and second switchback sections SW1 and SW2 are respectively structured with transport paths, which reverse the front/rear face of the original document by switchback transportation. First and second gates G1, G2 and third gate G5 are controlled to switch between positions indicated by broken and solid lines. Guide members G3 and G4 are composed of plate members biased by resilient plate members such as PET film or by springs, which are normally placed at the positions indicated by solid lines, and displaced to positions indicated by broken lines to guide the original document in a specific way when the original document passes through and pushes against the guide member.

Circular transport path CH, which is approximately circular, is formed with the transport paths P2, P4, and P6. Document sensors SK1 and SK2 read images on the original documents at the first and second reading positions R1 and R2 located at opposing positions to each other on the circle formed by circular transport path CH.

Operations of the image reading apparatus at single face reading and double face reading will be described with reference to FIGS. 2-6.

(Single Face Reading)

Figure 3:
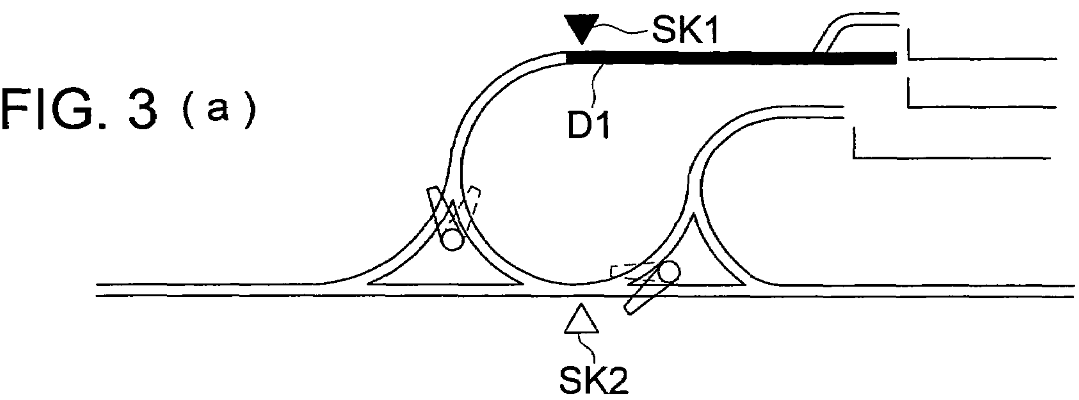
FIGS. 3(*a*)-3(*d*) illustrate diagrams showing operations of an image reading apparatus in the case of single face reading.
Figure 3:
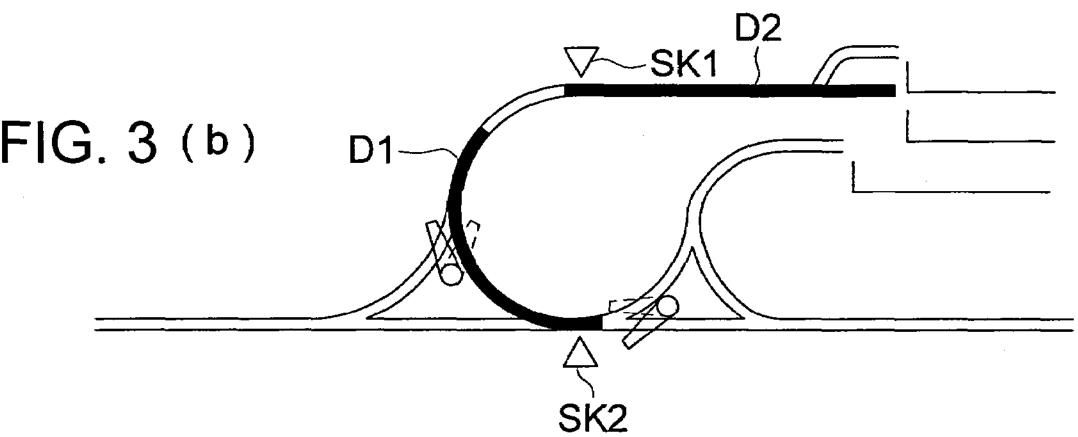
Figure 3:
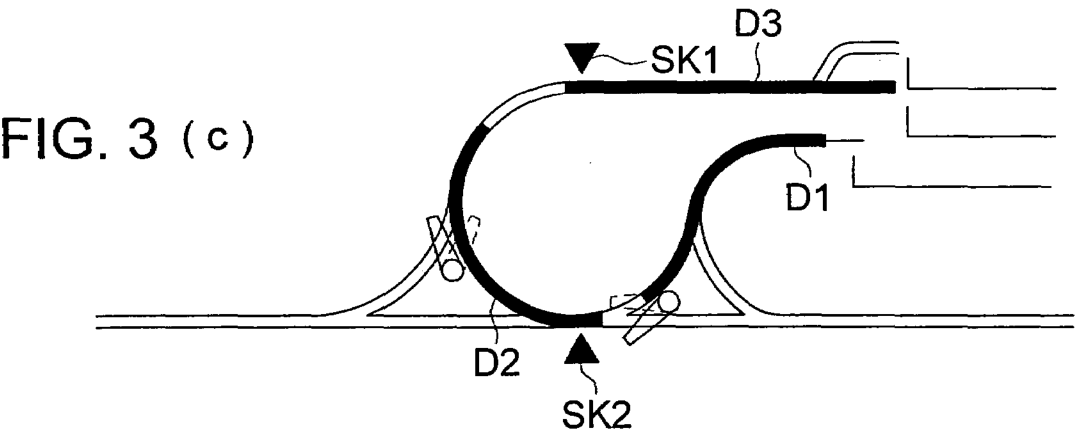
Figure 3:
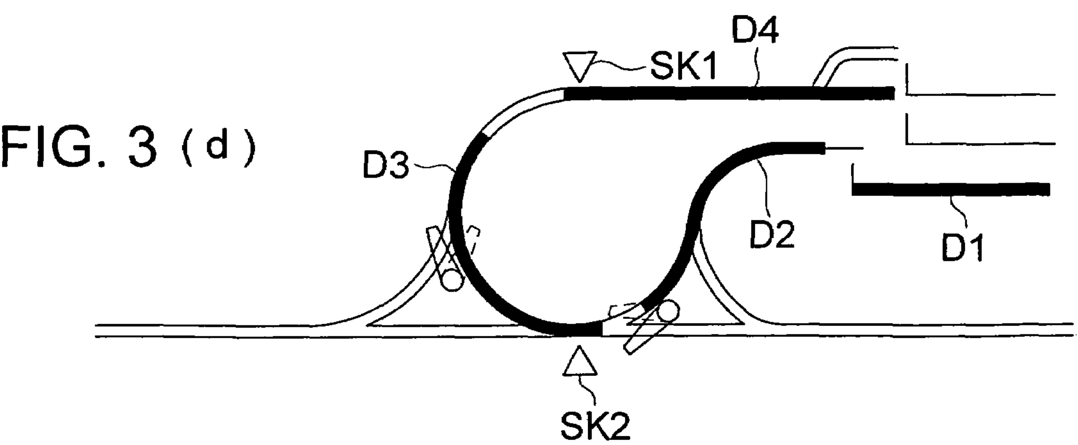
Figure 4:
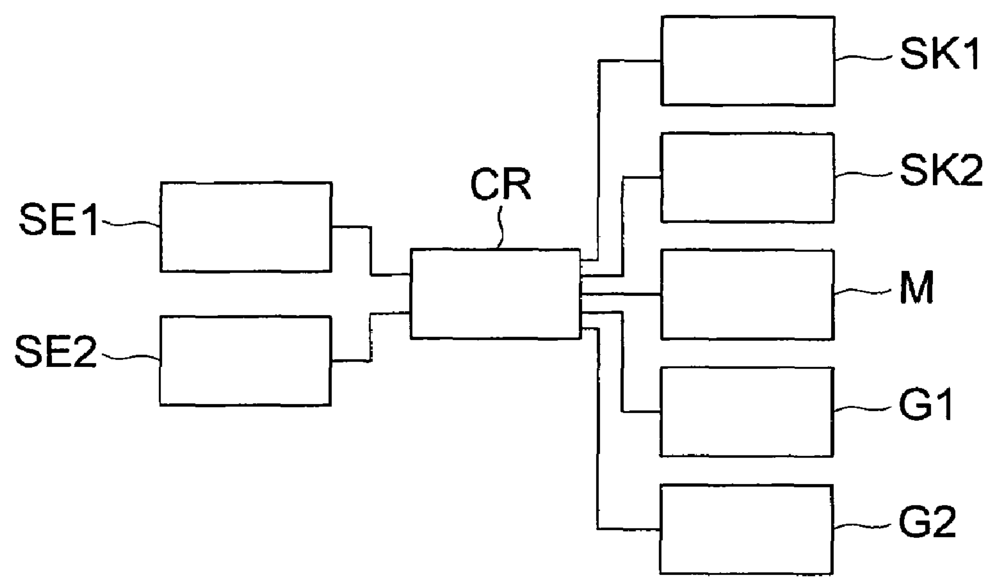
FIG. 4 illustrates a block diagram of a control system in an image reading apparatus relating to an embodiment of the present invention.
Figure 5:
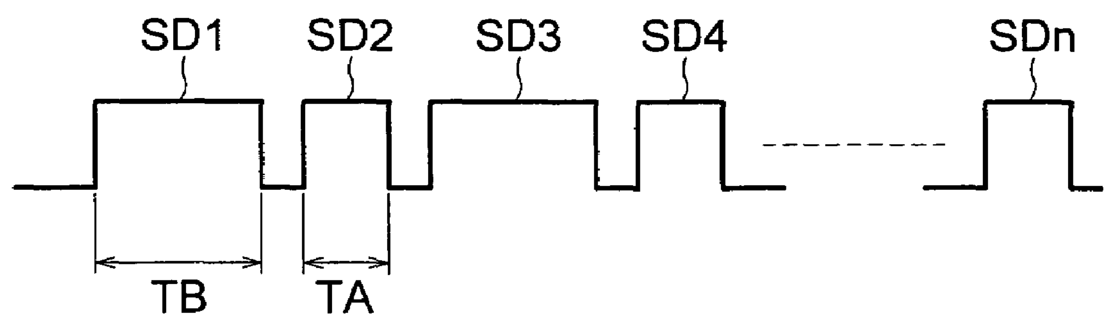
FIG. 5 shows a timing chart of original document movement in the case of single face reading.

FIGS. 3(*a*)-3(*d*) show operations of an image reading apparatus in the case of single face reading; FIG. 4 shows a block diagram of a control system in an image reading apparatus relating to an embodiment of the present invention; while FIG. 5 shows a timing chart of original document movement in the case of single face reading.

As shown in FIG. 3(*a*), original document D1 sent out from sheet supply tray TR1A or TR1B, moves in sheet supply path P1, and at first reading position R1 reading sensor SK1 reads the image on original document D1.

After image reading by SK1, the original document D1 moves through transport paths P2 and P4 to second reading position R2 of reading sensor SK2. In the case of single face reading, controller CR set first gate G1 at the position indicated by a solid line in FIG. 2, and prevents the original document D1 from passing through first switchback section SW1 (see FIG. 3(*b*)).

Original document D1 passes through second reading position R2, but reading sensor SK2 does not read the image of original document D1.

In FIGS. 3(*a*)-(*d*), the reading sensor conducting reading operation is illustrated by a solid triangle mark, and the reading sensor inactivated for reading operation is illustrated by an outline triangle mark. In FIG. 3(*a*)-(*d*), to avoid complications notations of other than the reading sensor and the original document are omitted. The following descriptions refer to the notations shown in FIG. 2.

After passing through transport path P4, original document D1 passes through transport path P6 and sheet ejection path P7, and is then ejected onto exit tray TR2 (FIG. 3(*c*)).

In the case of single face reading, controller CR sets second gate G2 at the position indicated by a solid line, and prevents the original document D1 from passing through the second switchback section SW2 (FIG. 3(*b*)).

As shown in FIG. 3(*b*), after the trailing end of the first document sheet D1 passes first reading position R1, second original document D2 reaches first reading position R1.

When original document D2 passes second reading section R2 after passing through transport paths P2 and P4, the reading sensor SK2 reads the image on original document D2.

Further, as shown in FIG. 3(*c*), after the trailing end of original document D2 passes the first reading position, third original document D3 reaches first reading position R1.

When original document D3 passes first reading section R1, reading sensor SK1 reads the image on original document. D3.

Similarly, when a fourth original document D4 is transported following to original document D3, SK2 reads the image on original document D4 (see FIG. 3(*d*)).

In this way, original documents D1, D2, D3 . . . are sequentially transported, images on odd-numbered original documents D1, D3, . . . are read by reading sensor SK1, and images on even-numbered original documents D2, D4, . . . are read by reading sensor SK2.

Controller CR starts transporting the next original document after checking for passage of the trailing end of the original document at reading position R1 of reading sensor SK1. This timing control by the controller is based on original document detection signal from document sensor SE1 provided near the first reading position R1.

FIG. 5 shows a timing chart of original document movement in the case of single face reading. SD1 is a detected signal of original document D1 by sensor SE1, while SD2 is a detected signal of original document D2 by sensor SE1. In this way, sensor SE1 outputs detected signal SDn when detecting original document Dn.

In cases where original documents are transported from first reading position R1 to second reading position R2 without being read by reading sensor SK1, namely in cases where the even-numbered original documents are transported through transport paths P2 and P4, controller CR controls transport of the original documents at transporting speed V2 which is higher than transporting speed V1 while reading images.

This transportation control is conducted based on document sheet detection signals from document sheet sensor SE1. Namely controller CR raises the transporting speed from V1 to V2, in a time period for transporting one original document after detecting the passage of the trailing end of odd-numbered original documents D1, D3, . . . . In practice, during certain time periods, including a period for transporting an original document and the interval period between original documents, controller CR controls the transporting speed to be higher.

Via such control, as shown in FIG. 5, original document transporting time TA for even-numbered original documents is shorter than TB for odd-numbered original documents.

Transporting time TB is restricted by such factors as performance of reading sensors SK1 and SK2, and required resolution of read image, however, transporting time TA is free of these restrictions and the transporting speed can be increased.

Based on the original document detection signal from original document sensor SE1 disposed near first reading position R1, controller CR conducts the control shown in FIG. 5 by controlling motor M to transport the original documents through transport paths P2 and P4. Further, the controller controls such that based on detection signals of original document leading end from the original document sensor SE1, reading sensor SK1 reads images of odd-numbered original documents, and based on detection signals of original document leading end from original document sensor SE2, reading sensor SK2 reads images of even-numbered original documents.

In the case of single face reading of high rigidity original document such as thick paper, gate G5 is displaced to the dotted-line position and the original document is linearly transported from sheet supply path P1 to transport path P8, reading sensor SK1 reads the image, and the original document is ejected onto exit tray TR3.

(Double Face Reading)

Operations in double face reading will now be described with reference to FIGS. 6(*a*)-6(*i*), which show operation of the image reading apparatus. In the descriptions below, labeling of components other than the reading sensor and original document can be referred in FIG. 2. The reading sensor conducting reading a operation is illustrated by a solid triangle mark, and the reading sensor not conducting a reading operation is illustrated by an outlined triangle mark.

In the case of double face reading, controller CR sets first and second gates G1 and G2 at the position indicated by broken lines, first gate G1 guides the original document to first switchback section SW1, and the second gate G2 guides the original document to second switchback section SW2.

Figure 6:
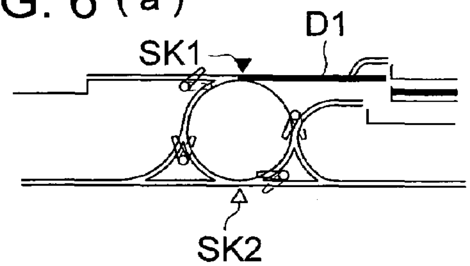
FIGS. 6(*a*)-6(*i*) illustrate diagrams showing operations of an image reading apparatus in the case of double face reading.
Figure 6:
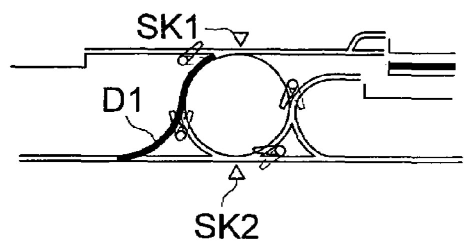
Figure 6:
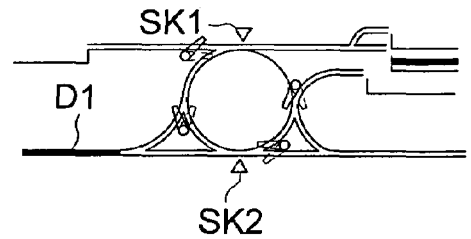
Figure 6:
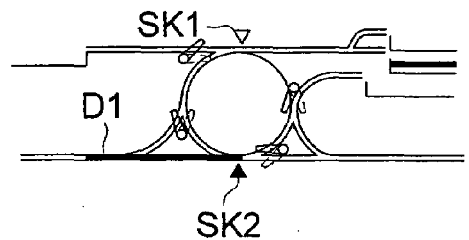
Figure 6:
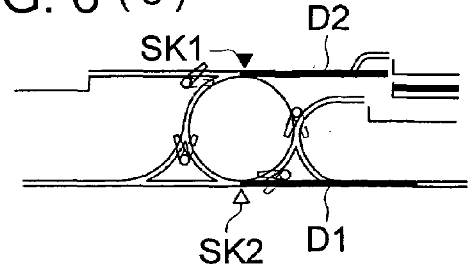
Figure 6:
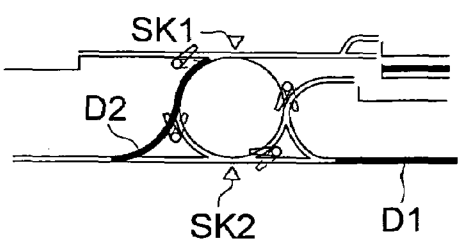
Figure 6:
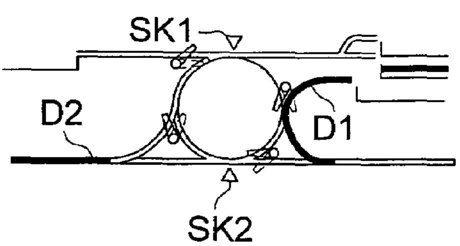
Figure 6:
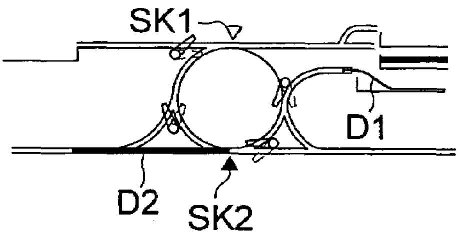
Figure 6:
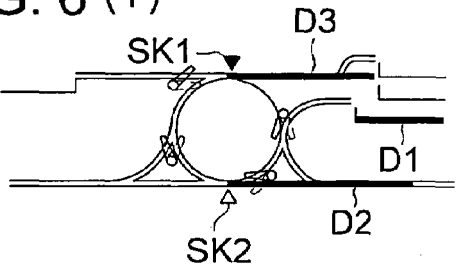

As shown in FIG. 6(*a*), original document D1 is fed from sheet feeding tray TR1A or TR1B, and reading sensor SK1 reads the image on the first face of original document D1.

Next, as shown in FIG. 6(*b*), original document D1, after having been read by the reading sensor SK1, is transported through transport path P2, and is guided by first guide G1 to first switchback section SW1.

Next, as shown in FIG. 6(*c*), original document D1, after being reversed front/rear face at first switchback section SW1, is transported through transport path P3, and reading sensor SK2 reads the image on the second face of original document D1 (see FIGS. 6(*c*) and 6(*d*)).

Next, original document D1 is guided by second gate G2 and proceeds to second switchback section SW2, while, second original document D2 moves through reading position R1 of reading sensor SK1, and the reading operation starts on the first face of second original document D2 (see FIG. 6(*e*)).

Subsequently, while original document D1 moves through second switchback section SW2, second original documents D2 is guided by first guide G1 and proceeds to first switchback section SW1 (see FIG. 6(*f*)).

Then, while original document D1 moves through transport path P5 and sheet ejection path P7 and is then ejected to exit tray TR2, second original document D2 passes reading position R2 of reading sensor SK2, and the image is read from the second face of second original document D2 (see FIGS. 6(*g*) and 6(*h*)).

After that, original document D2 is guided by second gate G2 to proceed into the second switchback section, and in doing so, third original document D3 moves into position of reading sensor SK1 and reading sensor SK1 starts reading the image on the first face of original document D3.

As described above, original documents are sequentially transported, and the first and the second face images are sequentially read, thus double face reading of multiple original documents is accomplished.

On exit tray TR2, original documents are stacked in proper order, from the bottom, of: the first face of original document D1, the second face of D1, the first face of second original document D2, the second face of D2, the first face of third original document D3, the second face of D3 . . . . This order becomes the same as the order on sheet supply trays TR1A and TR1B.

In the following, described are differences of transport paths between the present embodiment and conventional double face reading methods, and differences of reading speed caused by these differences of the transport paths.

Figure 7:
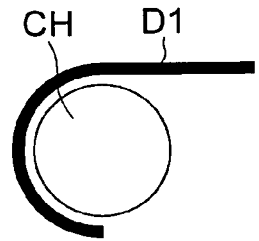
FIGS. 7(*a*)-7(*e*) show operations of a conventional image reading apparatus.
Figure 7:
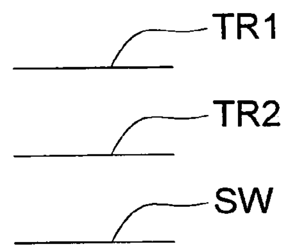
Figure 7:
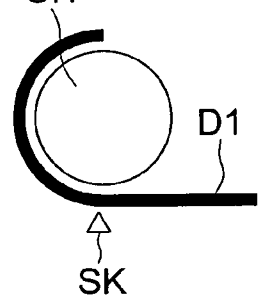
Figure 7:
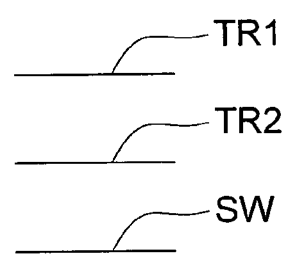
Figure 7:
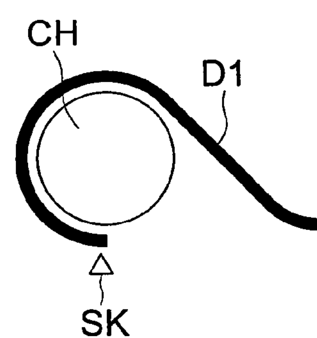
Figure 7:
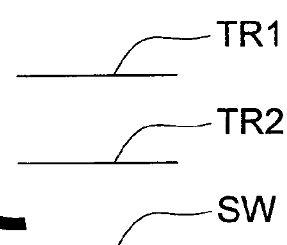
Figure 7:
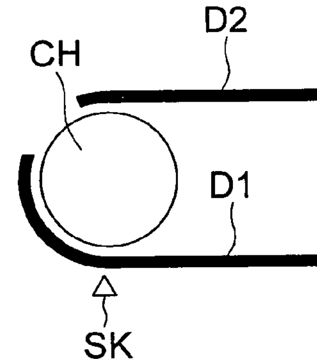
Figure 7:
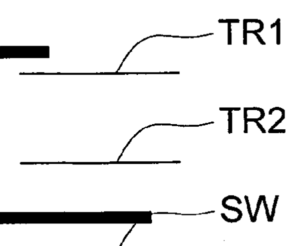
Figure 7:
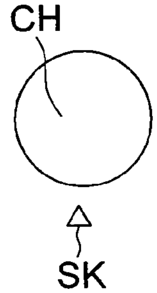
Figure 7:
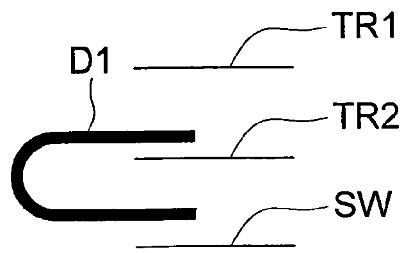

FIGS. 7(*a*)-7(*e*) show transportation steps in a conventional double face reading method.

In the double face reading method as shown in FIGS. 7(*a*)-7(*e*), the original document is transported two times through switchback section SW for second face reading and for page order alignment, and between each switchback operation the original document is transported around circular transport path CH, so that the original document passes two times around circular transport path CH. Second original document D2 starts to be transported only after the first original document D1 has passed two times around circular transport path CH.

Figure 8:
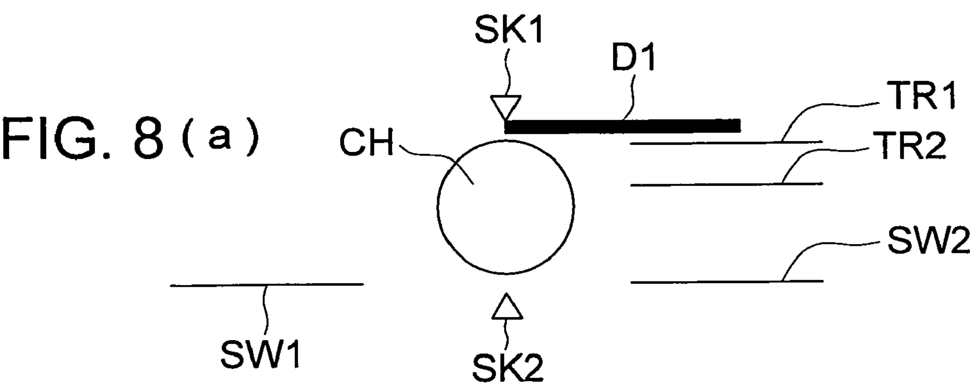
FIGS. 8(*a*)-8(*d*) show operations of the present embodiment in the case of double face reading.
Figure 8:
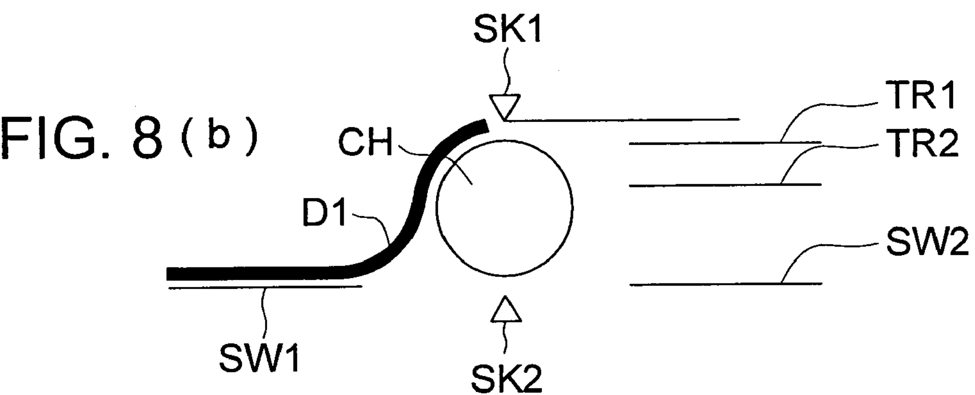
Figure 8:
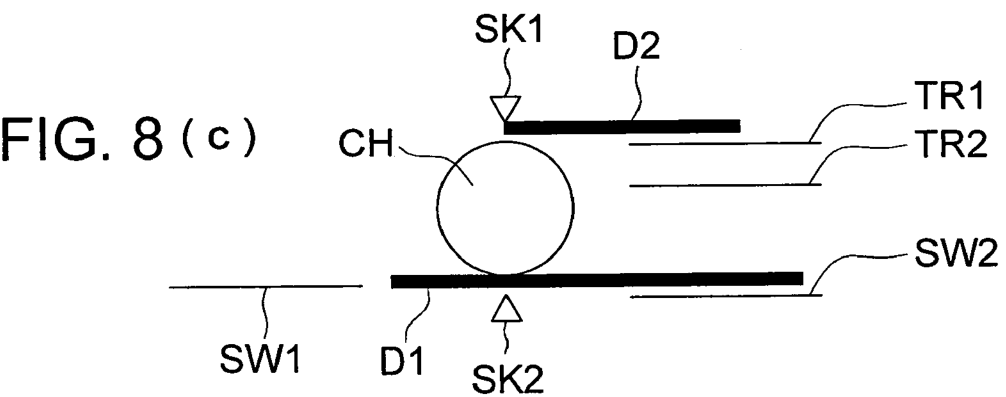
Figure 8:
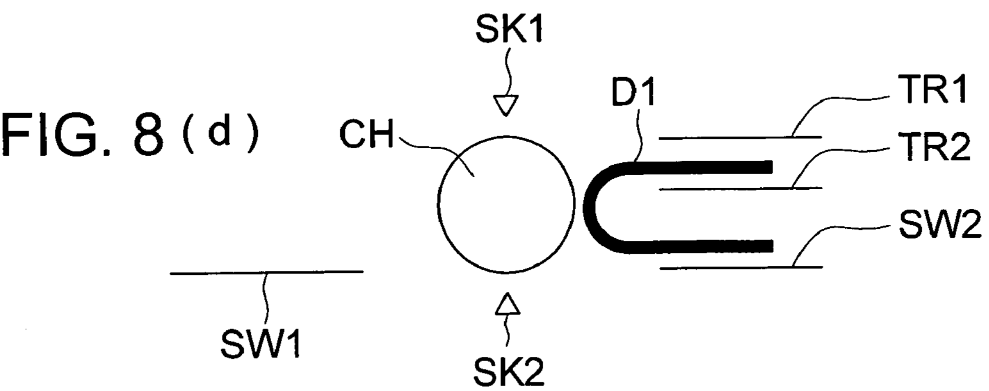

FIGS. 8(*a*)-8(*d*) show transportation steps in double face reading of the present embodiment. In the double face reading method as shown in FIGS. 8(*a*)-(*d*), the original document is transported two times through switchback sections SW1 and SW2, however, the original document is transported only once around circular transport path CH. Further, the second original document starts to be transported at the timing when the first original document has passed a half-way around circular transport path CH.

Therefore, in the present embodiment, the required total transport path is shortened and the interval between each original document in the sequential reading is also shortened, thus the reading speed is significantly improved compared to the conventional method.

In image forming apparatus B, double face image formation is conducted by using reversal transport path 10*a*. In cases where an image reading apparatus, which is structured such that reading sensors are disposed at both sides of original document transport path to conduct double face reading with only one passage of the original document, is connected to image forming apparatus B, productivity of double face image formation is improved, however, productivity of single face image formation is not improved.

In contrast, by connecting the above described image reading apparatus of the present embodiment to the image forming apparatus as shown in FIG. 1, a high efficiency copying apparatus can be realized in which copying speed of double faced original documents as well as single face original documents is improved.

According to the image reading apparatus of the present embodiment, reading speed can surpass the limitation caused by processing speed limitation of a reading sensor, etc., and high speed image reading apparatus can be realized.

According to the image reading apparatus of the present embodiment, comparing to the commonly used image reading apparatus in which a single reading sensor is utilized and double face reading is performed by reversal transportation of the original document, dramatically improved image reading can be attained.

Particularly in cases where the image reading apparatus is combined with an image forming apparatus, which performs double face image formation by the use of a reversal transport path, the performance of image forming speed of the image forming apparatus can be maximally utilized to realize high-speed double face copying.

Further, according to the copying apparatus of the present embodiment, in the copying apparatus having an image forming apparatus to form double face images by using a reversal transport path, the speed of double face image formation can be significantly improved.

What is claimed is:

1. An image reading apparatus for reading images on original documents, comprising:

a first reading section to read the images on the original documents;

a second reading section to read the images on the original documents at a position downstream of a reading position of the first reading section, in a transporting direction of the original documents; and a controller;

wherein, the controller controls in such a way that: the first reading section and the second reading section alternately read images on multiple original documents sequentially from document to document; and when an original document is transported to the reading position of the second reading section without an image on the original document being read by the first reading section, a transporting speed of the original document is higher than a transporting speed while the image on the original document being read.

2. The image reading apparatus of claim 1, further comprising a circular transport path which is approximately shaped circular, and the first and the second reading sections respectively read the images at opposed positions with each other about a center of a circle formed by the circular transport path.

3. The image reading apparatus of claim 1, further comprising a sheet supply section, which is capable to stuck multiple original documents and supplies the original documents sequentially for reading the images on the original documents.

4. The image forming apparatus of claim 1, further comprising a sheet exit section to stack the original documents whose images having been read.

5. A copying apparatus comprising:

the image reading apparatus described in claim 1; and an image forming apparatus capable of forming double faced images on a recording member based on image data generated by the image reading apparatus, wherein the image forming apparatus comprises a reversing transport path which reverses front/rear faces of the recording member.

6. An image reading apparatus for reading images on original documents, comprising:

a first reading section to read the images on the original documents;

a second reading section to read the images on the original documents at a position downstream of a reading position of the first reading section, in a transporting direction of the original documents;

a first switchback section;

a second switchback section;

a first gate to switch and transport or not an original document to the first switchback section;

a second gate to switch and transport or not to transport the original document to the second switchback section; and a controller;

wherein the controller controls in such a way that: in cases where an image on each single face of the multiple original documents is read, the multiple original documents are transported without passing through the first and the second switchback sections, and the first reading section and the second reading section alternately read images on the multiple original documents sequentially from document to document; and in cases where images on double faces of the multiple original documents are read, the multiple original documents are transported to pass through the first and the second switchback sections, and the first reading section reads each image on first faces of the multiple original documents and the second reading section reads each image on second faces of the multiple original documents.

7. The image reading apparatus of claim 6, wherein when an original document of the multiple original documents is transported to a reading position of the second reading section without an image on the original document being read by the first reading section, a transporting speed of the original document is higher than a transporting speed while the image on the original document being read.

8. The image reading apparatus of claim 6, further comprising a circular transport path which is approximately shaped circular, and the first and the second reading sections respectively read the images at opposed positions with each other about a center of a circle formed by the circular transport path.

9. The image forming apparatus of claim 8, further comprising a linear transport path to transport the original document without passing through the circular transport path and allow the images on the original document to be read at the first reading section.

10. The image reading apparatus of claim 6, wherein the first reading section read the images at a position upstream of the first switch back section in the transporting direction, and the second reading section read the images at a position downstream of the first switch back section and upstream of the second switchback section in the transporting direction.

11. The image reading apparatus of claim 6, further comprising a sheet supply section, which is capable to stuck multiple original documents and supplies the original documents sequentially for reading the images on the original documents.

12. The image forming apparatus of claim 6, further comprising a sheet exit section to stack the original documents whose images having been read.

13. A copying apparatus comprising:

the image reading apparatus described in claim 6; and an image forming apparatus capable of forming double faced images on a recording member based on image data generated by the image reading apparatus, wherein the image forming apparatus comprising a reversing transport path which reverses front/rear faces of the recording member.

* * * * *